US007219369B2

(12) United States Patent
Hashimoto et al.

(10) Patent No.: US 7,219,369 B2
(45) Date of Patent: May 15, 2007

(54) INTERNAL MEMORY TYPE TAMPER RESISTANT MICROPROCESSOR WITH SECRET PROTECTION FUNCTION

(75) Inventors: Mikio Hashimoto, Kanagawa (JP);
Kensaku Yamaguchi, Kanagawa (JP);
Kenji Shirakawa, Kanagawa (JP);
Kensaku Fujimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 854 days.

(21) Appl. No.: 10/391,618

(22) Filed: Mar. 20, 2003

(65) Prior Publication Data

US 2003/0182571 A1    Sep. 25, 2003

(30) Foreign Application Priority Data

Mar. 20, 2002    (JP)    ............................. 2002-079155

(51) Int. Cl.
*G06F 21/22*    (2006.01)
*G06F 12/14*    (2006.01)
(52) U.S. Cl. .......................... 726/21; 726/17; 713/194; 711/163; 711/203
(58) Field of Classification Search ..................... None
See application file for complete search history.

(56) References Cited

U.S. PATENT DOCUMENTS

| 4,558,176 | A | | 12/1985 | Arnold et al. |
| 5,628,023 | A | | 5/1997 | Bryant et al. |
| 5,666,411 | A | | 9/1997 | McCarty |
| 5,845,129 | A | | 12/1998 | Wendorf et al. |
| 5,991,399 | A | * | 11/1999 | Graunke et al. ............ 380/279 |
| 6,105,137 | A | * | 8/2000 | Graunke et al. ............... 726/24 |
| 6,496,934 | B2 | * | 12/2002 | Suzuki et al. .................. 726/27 |
| 6,775,779 | B1 | * | 8/2004 | England et al. ............... 726/26 |

FOREIGN PATENT DOCUMENTS

| DE | 199 25 195 | 12/2000 |
| JP | 2000-66956 | 3/2000 |
| WO | WO 01/16759 | 3/2001 |

OTHER PUBLICATIONS

T. Gilmont, et al., Euromicro Conference IEEE Comput. pp. 449-456, XP-010352217, "Enhancing Security in the Memory Management Unit", Sep. 8, 1999.
T. Gilmont, et al., Security and Watermarking of Multimedia Contents, vol. 3657, XP-002284378, pp. 472-483, "An Architecture of Security Management Unit for Safe Hosting of Multiple Agents", Jan. 25, 1999.
D. Lie, et al., Proceedings of ASPLOS 2000, pp. 1-10, "Architectural Support for Copy and Tamper Resistant Software", Nov. 2000.

* cited by examiner

*Primary Examiner*—Christopher Revak
(74) *Attorney, Agent, or Firm*—Oblon, Spivak, McClelland, Maier & Neustadt, P.C.

(57) ABSTRACT

In an inner memory type tamper resistant microprocessor, a requested secret protection attribute requested for each access target memory page by a task is set and stored exclusively from other tasks, at a time of reading a program into memory pages and executing the program as the task, and a memory secret protection attribute is set and stored for each access target memory page by the task, at a time of executing the task. Then, an access to each access target memory page is refused when the requested secret protection attribute for each access target memory page and the memory secret protection attribute for each access target memory page do not coincide.

16 Claims, 10 Drawing Sheets

MEMORY ACCESS PROCEDURE

INTERNAL MEMORY MAP

MPA TABLE

MTR REGISTER

MEMORY ACCESS PROCEDURE

FIG.7 MEMORY ACCESS PROCEDURE

TLB CONFIGURATION

INTERNAL MEMORY TYPE TAMPER RESISTANT MICROPROCESSOR WITH SECRET PROTECTION FUNCTION

BACKGROUND OF THE INVENTION

1. Field of the Invention

The present invention relates to a tamper resistant microprocessor capable of preventing the illegal alteration of execution codes and processing target data under the multitask program execution environment, which has a large capacity internal memory capable of storing a plurality of programs and their work areas, that is provided inside a package.

2. Description of the Related Art

The open system is widely spread today as an information network system. In the open system, hardware information of a computer for general user such as PC and system program (or OS) information are disclosed, and the end-user can make any desired improvement by modifying the system program.

Under such a circumstance, in order to guarantee the copyright protection for data handled by application programs or the copyright protection for programs themselves, there is a need for hardware that protects the secret of the program, which is based on the presumption that the OS of the system can carry out hostile operations with respect to applications. Such hardware has been proposed especially in a form of a microprocessor (see commonly assigned co-pending U.S. patent application Ser. No. 09/781,158 and No. 09/781,284; and Lie et al., "Architectural Support for Copy and Tamper Resistant Software", Computer Architecture News 28(5), pp. 168-).

These microprocessors have a function for encrypting a program and data handled by that program under the multitask environment in order to protect them from the peeping and the alteration. In the following, such a microprocessor will be referred to as a tamper resistant microprocessor.

The main purpose of the tamper resistant microprocessor is to protect the rights of the copyright owners of programs, contents and network services by protecting applications operated on the end-user's system. More specifically, three major concerns are:

(1) the protection of secrets of algorithms implemented in programs;

(2) the protection of secrets of trade secrets and contents embedded in programs, or the protection against the illegal copying; and (3) the protection of the program operations and the processing results against the alteration.

The protection of algorithms implemented in programs is necessary in order to protect the copyright owners of the programs. The protection of the trade secrets embedded in programs is necessary in order to prevent illegal copies of copyright protected contents handled by the programs. In the application in which a program that utilizes a network service exchanges a charging information with a server, it is particularly important to prevent the illegal alteration so that the charging information transmission operation is executed properly, for the purpose of protecting the right of the service provider. As a practical example, it is well known that a program for reproducing DVD on PC was analyzed to obtain the trade secret for decrypting the encryption of DVD and a program (DeCSS) for illegally copying DVD was produced.

Here, the currently proposed application program secret protection mechanisms in the open system will be briefly described, according to the proposition made by the present inventors and others (see commonly assigned co-pending U.S. patent application Ser. Nos. 09/781,158, 09/781,284, 09/984,407 and 10/059,217, for example). The exemplary mechanism described here has the feature that it is capable of protecting secrets independently from the OS that manages the system resources, for each one of a plurality of programs of a plurality of program vendors that are to be operated in a pseudo-parallel manner on a single system. Such a protection environment will be referred to as a "multi-party application protection environment".

FIG. 11 shows an outline of the currently proposed multi-party application protection environment. A target system (PC, for example) 1102 has a built-in tamper resistant microprocessor 1103, as well as a secondary memory 1107 such as hard disk and a memory 1108 provided at external of the processor. The system 1102 and a user 1112 constitute a system environment 1101.

A plurality of different program vendors 1121-1 to 1121-n respectively deliver the encrypted programs 1123-1 to 1123-n to the target system 1102 through a network. The encrypted program will be also referred to as a protected program.

The encrypted program delivered from the vendor is stored in the secondary memory 1107 of the target system 11-2, and read into a region 1109 secured on the external memory 1108 at a time of the execution. On the external memory, the program is still in the encrypted state. The encrypted program is decrypted when it is read from the external memory 1108 into the microprocessor 1103. The decryption processing is carried out by the protection function 1106 by using a key sent from the vendor in correspondence to each program. The decrypted program is read into the cache memory 11-4. In the decryption of the program and the reading into the cache memory 1104, the entire program is not read all at once, and the reading is carried out portion by portion according to the execution of the program. The program portion read into the cache memory is in the plaintext state.

Inside the microprocessor 1102, the program is handled in the plaintext form by the protection function 1106, and there is no room for the OS 1110 to intervene. Also, the content of the cache memory 1104 cannot be directly read from the external, except for the operation defined by the specification of the microprocessor 1103.

On the other hand, in recent years, due to the advance of the integrated circuit technology, it becomes possible to implement a large capacity memory within the same package as the microprocessor. In such an internal memory type processor, even though there is a limit to the maximum memory capacity, there is a possibility of reducing the encryption processing load at times of the memory reading or writing which has been an overhead in the conventional tamper resistant processor that presupposes the external memory.

However, even if the memory is arranged inside the microprocessor as an internal memory, the memory resource management is under the management of the OS so that there is a possibility for the hostile operations by the OS. Consequently, in the internal memory type microprocessor, there is a need for the program secret protection under the management of the OS, but there has been no concrete proposition for realizing the secret protection.

In addition, in the case of processing a plurality of different encrypted programs rather than a single program, in a pseudo-parallel manner in the internal memory type microprocessor, there is a need to guarantee the secret protection for each one of a plurality of programs individually, but there has been no proposition in this regard either.

In order to realize the multi-task processing while guaranteeing the secret protection in the internal memory type tamper resistant microprocessor, the following should be taken into consideration:

(1) the integrity of the memory operations that can protect a plurality of programs from the intentional alteration;

(2) the compatibility of the resource management by the OS and the secret protection of the internal memory; and (3) the communications between the task and the OS.

More specifically, in the case where some task carries out the "n" memory operations with respect to some address in the internal memory, it must be protected during this process from the memory operations by another task as well as from the intentional attack by the OS. This is because the execution of the task comprises many instruction steps, and the correct result can be obtained only when all of these are executed correctly. In the case where the attacker including the OS executes only some part of the program or excludes only a specific operation among a series of memory operations, the operation of the program is willfully changed and the correct program execution becomes impossible.

Also, at a time of the memory page operation that is carried out by the OS as a part of the resource management, there is a possibility for an attack utilizing the release of the memory, and in order to eliminate such an attack, there is a need to make the resource management and the program secret protection compatible.

In addition, when the task issues a system call, the data exchange with the OS is carried out and for this purpose there is a need to carry out the communications by sharing the memory with the OS.

Here, consider the internal memory type processor to which the protection mechanism of the conventional external memory type tamper resistant microprocessor is directly applied. First, the main internal memory is divided into units (4 Kbyte pages) called blocks or pages. Inside the processor, a table for maintaining the secret protection attribute for each memory page is provided, where a table entry maintains the secret protection attribute of a corresponding memory page. In the secret protection attribute descriptor of the memory page operated by the task $T_\varnothing$, the ID of the task $T_\varnothing$ is automatically set such that it becomes impossible for the other tasks including the OS to read or write the content in plaintext.

However, the OS can forcefully release the secret protection attribute of some memory page for the purpose of the re-utilization of the memory page. When the secret protection attribute of the memory page is released, the content of the page is completely deleted and initialized to the prescribed value, so that the secret of the original task can be protected.

Now, suppose that the task $T_\varnothing$ carries out the "n" memory operations $Op_1$ to $Op_n$ with respect to the memory page $M_\varnothing$ of some address $A_\varnothing$, from the initial state of the memory page $M_\varnothing$. The initial state may be indeterminate, and the purpose is to obtain the result in the final state by surely carrying out the operations $Op_1$ to $Op_n$. Of course the memory operations by another task should not be mixed during this process.

The memory operation by the general task can be eliminated by the conventional external memory type protection mechanism. However, an attack in which the OS releases the secret protection attribute of the memory page $M_\varnothing$ and then rewrites this page by the intended data of the attacker cannot be eliminated or detected even when the external memory type protection mechanism is directly applied to the internal memory type. The secret of data before the releasing of the secret protection attribute can be protected, but the replacement by the other data cannot be prevented.

As a result, the attacker having the OS privilege can freely rewrite the secret memory content of the task according to the attacker's intention.

The forceful releasing of the secret protection attribute of the memory page can be a threat to the task secret protection. However, under the multi-task system, it is impossible to use a configuration which does not have such a forceful release function such that only the task itself can release the protection attribute, because in such a configuration, it becomes impossible for the OS to control the situation where some task occupies an excessively large part of the memory.

Also, the memory access in the non-protected state for the purpose of carrying out communications between the OS and the task and the protected memory access must be compatible.

BRIEF SUMMARY OF THE INVENTION

It is therefore an object of the present invention to provide an internal memory type tamper resistant microprocessor, which has a relatively large capacity internal memory inside a package, and which is capable of realizing the efficient internal data management that can prevent the illegal alteration of execution codes and processing target data under the multi-task program execution environment.

According to one aspect of the present invention there is provided an inner memory type tamper resistant microprocessor, comprising: a decryption unit configured to decrypt each one of a plurality of programs encrypted by different encryption keys; an internal memory configured to store the plurality of programs decrypted by the decryption unit, in plaintext in memory page units; a requested secret protection attribute maintaining unit configured to set and store a requested secret protection attribute requested for each access target memory page by a task, exclusively from other tasks, at a time of reading a program into memory pages and executing the program as the task; a memory secret protection attribute maintaining unit configured to store a memory secret protection attribute for each memory page; a secret protection management unit configured to set the memory secret protection attribute in the memory secret protection attribute maintaining unit, for each access target memory page by the task, at a time of executing the task; and a memory protection unit configured to compare the requested secret protection attribute for each access target memory page stored in the requested secret protection attribute maintaining unit and the memory secret protection attribute for each access target memory page stored in the memory secret protection attribute maintaining unit, and refuse an access to each access target memory page when the requested secret protection attribute for each access target memory page and the memory secret protection attribute for each access target memory page do not coincide.

According to another aspect of the present invention there is provided a secret protection method for an inner memory type tamper resistant microprocessor, comprising: (a) decrypting each one of a plurality of programs encrypted by different encryption keys; (b) storing the plurality of programs decrypted by the step (a), into an inner memory in plaintext in memory page units; (c) setting and storing a requested secret protection attribute requested for each access target memory page by a task, exclusively from other tasks, at a time of reading a program into memory pages and executing the program as the task; (d) setting and storing a memory secret protection attribute for each access target memory page by the task, at a time of executing the task; and (e) comparing the requested secret protection attribute for each access target memory page stored by the step (c) and the memory secret protection attribute for each access target memory page stored by the step (d), and refusing an access to each access target memory page when the requested secret protection attribute for each access target memory page and the memory secret protection attribute for each access target memory page do not coincide.

Other features and advantages of the present invention will become apparent from the following description taken in conjunction with the accompanying drawings.

DETAILED DESCRIPTION OF THE INVENTION

In the following description, the conventional tamper resistant microprocessor which reads and processes the program stored in the encrypted state in the external memory will be referred to as an "external memory type tamper resistant microprocessor", and a tamper resistant microprocessor which stores the program in the plaintext state inside a package of the microprocessor will be referred to as an "internal memory type tamper resistant microprocessor".

Also, in the following description, the program secret protection implies not only that the work data of the program encrypted by a unique program key cannot be read from the other program, but also that it is possible to prevent attacks such as the alteration of data according to the intention of an attacker and the alteration of the operation of the program.

<First Embodiment>

Figure 1:
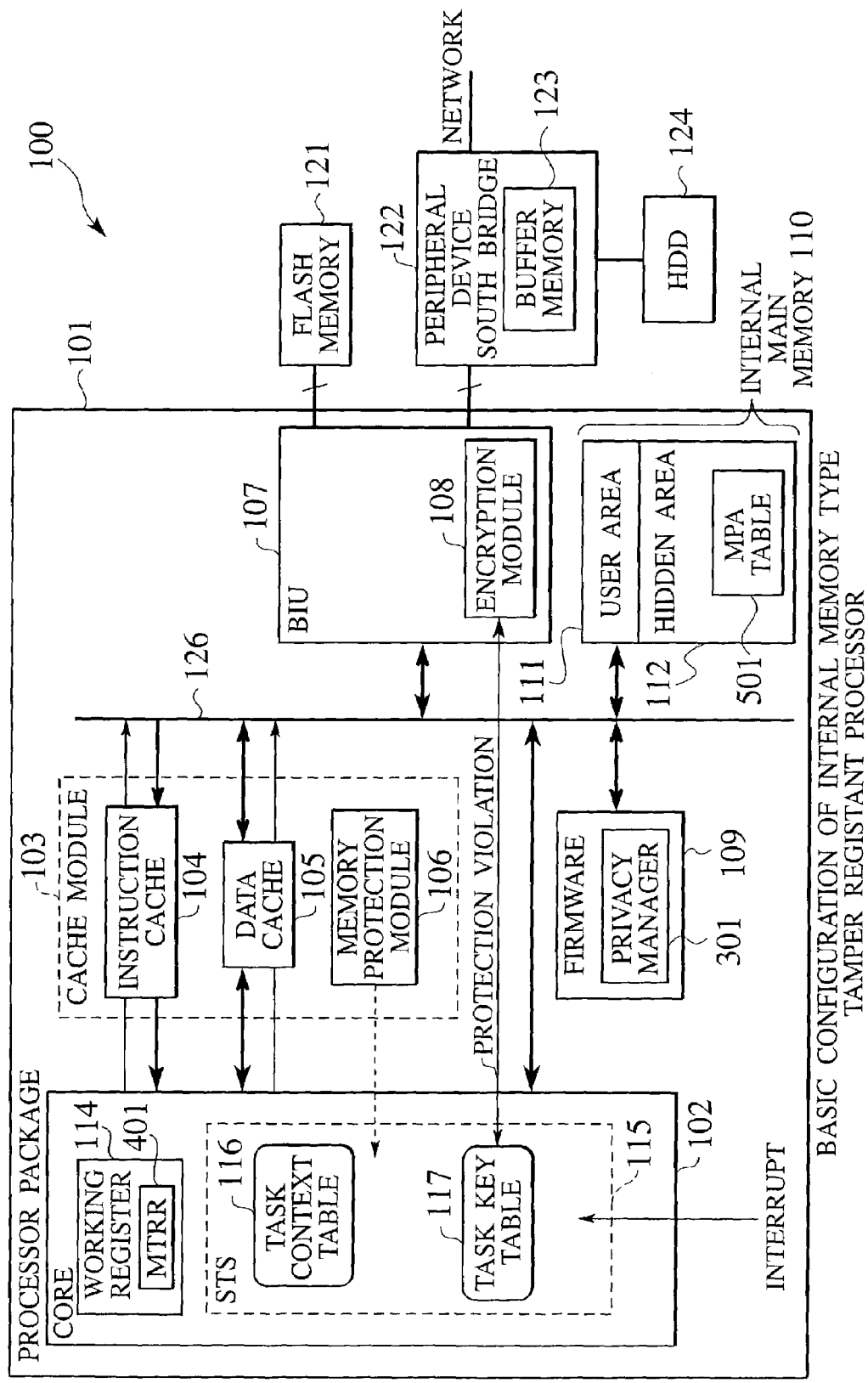
FIG. 1 is a block diagram showing a schematic configuration of an internal memory type tamper resistant microprocessor according to the first embodiment of the present invention.

FIG. 1 shows a schematic configuration of the internal memory type tamper resistant microprocessor according to the first embodiment of the present invention. A processor 100 has a processor core 102, a cache module 103, a bus interface unit (BIU) 107, a firmware (ROM) 109 that contains a privacy manager (secret protection management unit), and an internal memory 110, inside a processor package 101, all of which are inter-connected through an internal bus 126.

The processor core 102 has a working register to be used by the currently executed program, and a task switching unit (STS: Secure Task Switcher) 115. The working register 114 contains an MTR (Memory Type Range) register 401. The MTR register 401 stores a requested secret protection attribute (RPA: Requested Protection Attribute) for specifying whether the task requests the secret protection for an internal memory region (that is, a memory page) that is an access target, or not. The task switching unit 115 has a context key table 116 for maintaining the currently executed register states in correspondence to the task and a key table (task key table) 117 for maintaining a key information such as a program encryption key in correspondence to the task.

Although not shown in the figure, the firmware 109 stores a secret key unique to the processor 100. The firmware 109 contains a secret protection management unit 301 called privacy manager, and manages the memory secret protection attribute (MPA: Memory Protection Attribute) of each memory page of the internal memory 110. The privacy manager 301 is realized as a program stored in the firmware, for example.

The internal memory 110 is largely divided into two regions: a user area 111 and a hidden area 112. The user area 111 stores the OS and the program including its system area at a time of the execution. The hidden area 112 is a region that can be operated only by the privacy manager 301, and stores the memory secret protection attribute (MPA: Memory Protection Attribute) table 501. The MPA table 501 stores the secret protection attribute for each memory page. The above described privacy manager 301 sets the memory secret protection attribute in the MPA table 501, in response to the secret protection instruction issued by the task, for the corresponding memory page. The operation by the OS cannot affect the hidden area 112.

The cache module 103 has an instruction cache 104, a data cache 105, and a memory protection module (memory protection unit) 106. The data cache 105 reads the page content of the user area 112 of the internal memory 110 and the secret protection attribute maintaining in the MPA table 501 in correspondence to it, at a time of the execution of the program (that is, at a time of access to the target region). The memory protection module 106 compares the memory secret protection attribute (MPA) written in the cache tag of the data cache 105 and the requested secret protection attribute (RPA) specified by the task and outputted from the MTR register 401 of the core 102, and permits access to the target memory page only when these two attributes coincide.

The BIU 107 has an encryption module (decryption unit) 108, and encrypts the input/output data with respect to the external. The processor 100 carries out input/output with respect to the external through the BIU 107. A peripheral device south bridge 122 connected to the processor through an external bus has a buffer memory 123 inside. The peripheral device south bridge 122 is connected with a flash memory 121 and a HDD 124.

Figure 2:
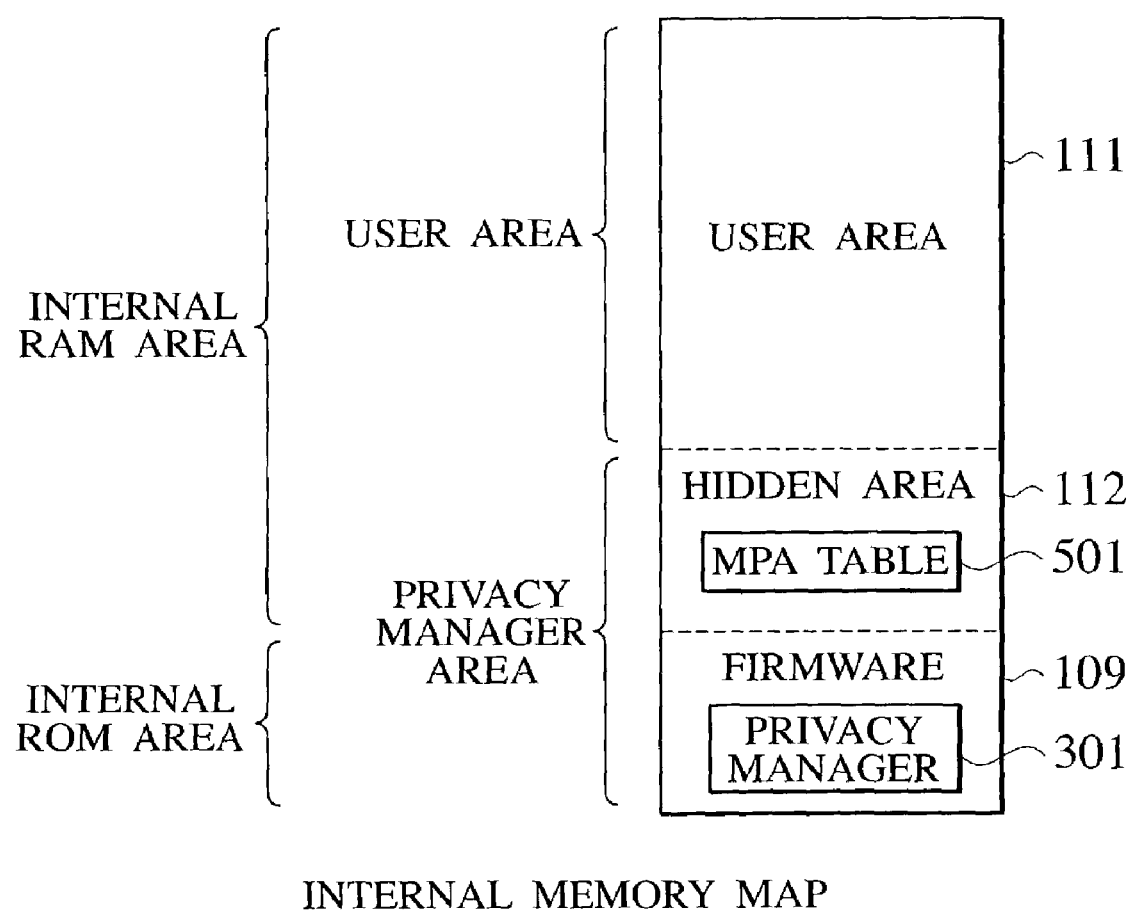
FIG. 2 is a diagram showing an internal memory map in the internal memory type tamper resistant microprocessor of FIG. 1.

FIG. 2 shows an internal memory map. The user area 111 and an area for the privacy manager 301 are separated on the memory map. The first half part of the memory map is allocated to the user area, and the second half part is allocated to the privacy manager area. The external program located in the user area 111 cannot access to the firmware region 109 that contains the privacy manager 301.

In the first embodiment, for the sake of simplicity, the processor of the real address scheme which has no virtual address mechanism will be assumed. In the following, the operation of such a tamper resistant microprocessor will be described in detail.

(Program Reading and Task Generation)

Figure 3:
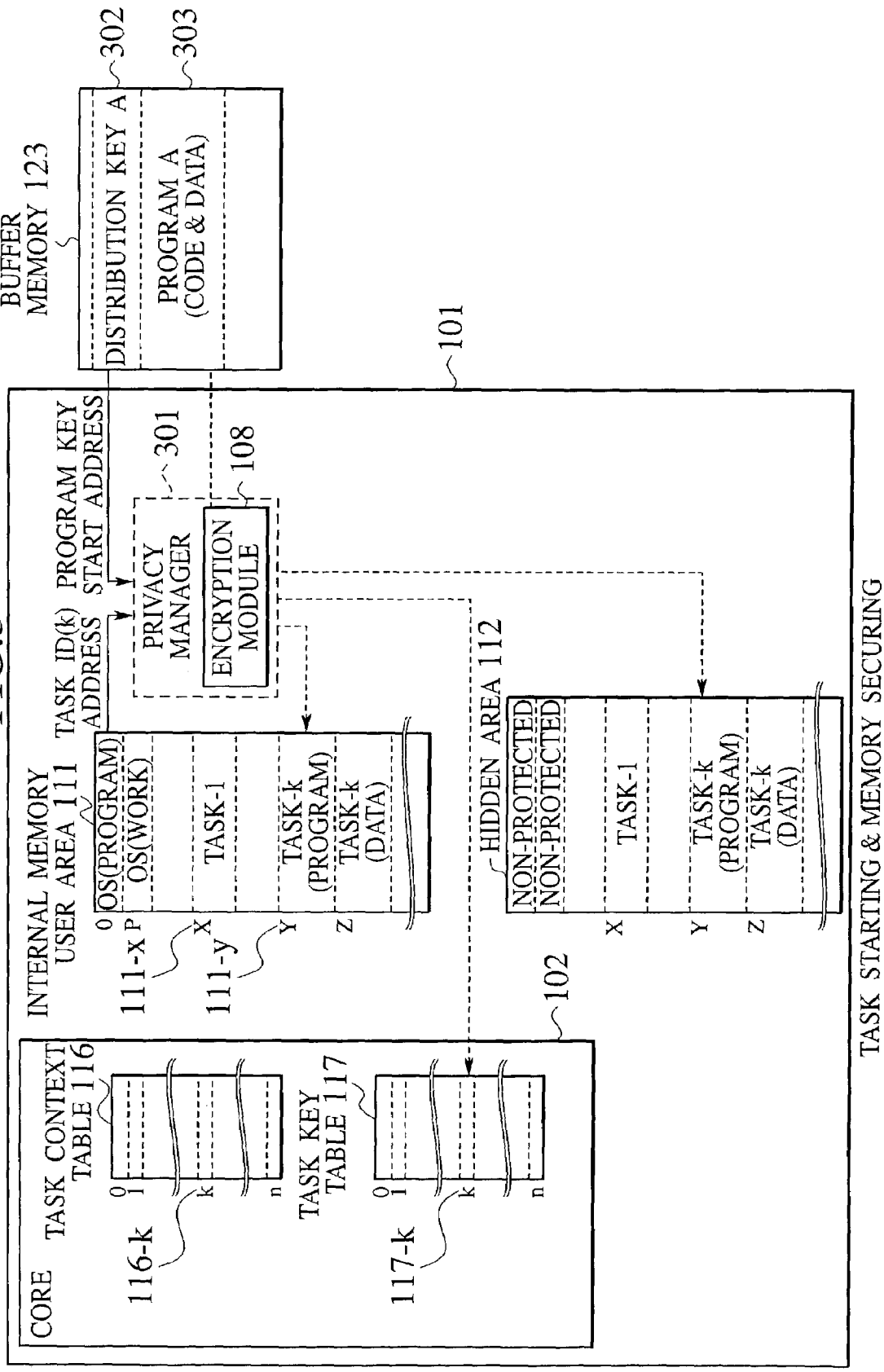
FIG. 3 is a diagram for explaining a task start and a memory securing in the internal memory type tamper resistant microprocessor of FIG. 1.

FIG. 3 shows the schematic procedure for the reading of the program A and the generation of the task by the microprocessor 100 of FIG. 1. The program A is stored in the flash memory 121 (FIG. 1) or the HDD 124 (FIG. 1) external of the microprocessor, in the encrypted state, before it is executed by the processor 100.

Before the reading of the program A, the task-1 generated as a result of reading the OS and the other program is read in the user area 111. The OS is read in regions starting from addresses O and P of the user area 111, and the task-1 is read in a region starting from an address X.

The program A comprises a distribution key 302 and a program body 303. In reading the program A, the OS reads the program A in the encrypted state into the buffer memory 123 of the peripheral device south bridge 122 by a prescribed procedure. Next, the OS issues a task generation instruction, by specifying an address of the program in the buffer memory 123, an address Y for arranging the program in the internal memory, and a task ID (task-k).

When the task generation instruction is issued, the control is shifted from the OS to the privacy manager 301. The privacy manager 301 is implemented as a program stored in the firmware 109, for example, and has a privilege stronger than the OS which is an external program, in order to protect the secret of the program. Only the privacy manager 301 can operate the hidden area 112 of the internal memory, the context table 116 and the task key table 117.

The privacy manager 301 acquires the distribution key 302 of the program A from the buffer memory 123, decrypts the distribution key 302 through the encryption module 108 by using the processor secret key (not shown) stored in the firmware 109, and extracts the program key. This program key is stored into an entry 117-k corresponding to the task ID (that is, task-k) in the task key table 117. Next, the program body 303 in the buffer memory 123 is decrypted through the encryption module 108 by using the program key, and the decrypted program is arranged in a region starting from the program arrangement address Y in the internal memory.

In addition, the task ID (k) is written into entries corresponding to the program arrangement regions of the memory secret protection attribute (MPA) table 501 (FIG. 1) in the hidden area 112, gives the protection attribute to these regions in order to prevent access from the other tasks. The entry of the MPA table 501 is set up for each memory page (where one page is 4 Kbytes, for example), as will be described below. In the entry of the task-1 that has been executed until then, the task ID=1 has been written, and the task ID=k will be written as a result of the reading of the program A.

This completes the preparation of the task execution, and after the control is returned to the OS once, the OS issues an instruction for commanding the start of the execution of the task ID=k. Then, the execution of the program A, that is the task-k, is started from a prescribed address. Note that, in the first embodiment, the privacy manager 301 is realized by the firmware 109, but it may be implemented by hardware. In the case of the implementation by hardware, the OS can process the other task while the task execution preparation of the privacy manager 301 is in progress so that the response performance of the system can be improved.

(Memory Securing)

Now, in executing the generated task-k, the task-k dynamically secures the necessary memory region in the internal memory 110. First, the task-k requests the memory region to the OS. The OS allocates an available memory region, such as a memory region starting from an address Z, for example, to the task-k. The task-k sets the secret protection attribute of the region in order to use this region as a region that is exclusively accessible only by the task-k. The secret protection attribute is set by the task-k by specifying an address region and issuing a secret protection attribute setting instruction explicitly. The setting of the secret protection attribute can be made only by this task, and even the OS cannot set the protection attribute of the other task.

Note that, usually, the OS sets a resource protection attribute of the region in the memory management unit MMU (not shown) in order to avoid the conflict regarding the memory resource with the other task, such that the other task cannot access. It should be noted that this setting is solely for the purpose of the resource protection by the OS, and it cannot plays a role for protecting the secret of the task in the case of the malicious OS.

When the protection attribute setting instruction is issued from the task-k, the processing is shifted to the privacy manager 301. The privacy manager 301 writes the ID of the task-k which is a source that issued the instruction, into an entry corresponding to the region specified in the MPA table 501, to protect this region from access by the other task.

Figure 4:
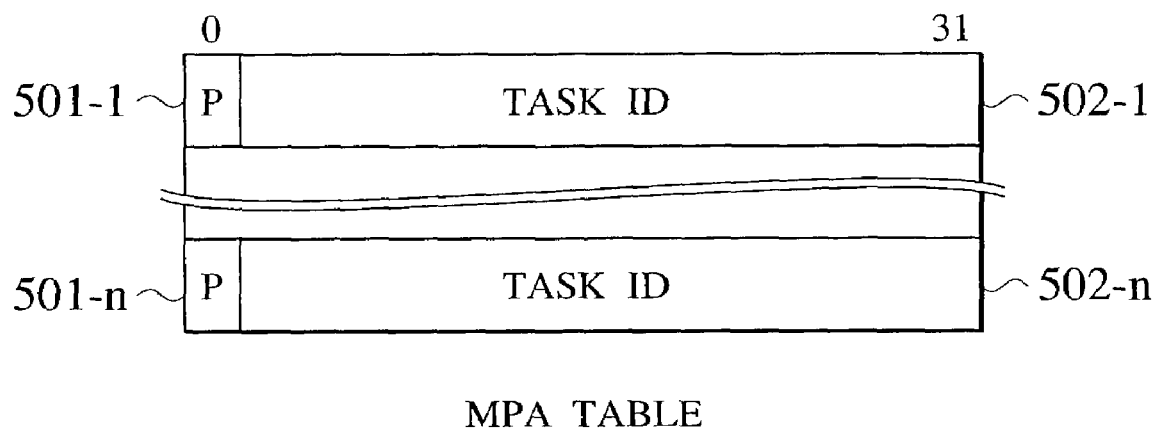
FIG. 4 is a diagram showing an exemplary configuration of an MPA table in the internal memory type tamper resistant microprocessor of FIG. 1.

A format of the MPA table 501 is as shown in FIG. 4, for example. The PAM table 502 has entries 501-1 to 501-n corresponding to the memory pages. The entry has two fields, where a field P stores a secret protection bit indicating presence/absence of the secret protection of the corresponding memory page. For example, when the value of the secret protection bit is "1", it implies the presence of the secret protection. The other field stores the task ID. Note that in the case where the processor has the MMU (not shown) for the purpose of the resource management, it is preferable to use a configuration in which the privacy manager 301 checks that the source task that issued the protection attribute setting instruction has the access right for the target region.

(Memory Access by the Protected Task)

When the task accesses the address to which the protection attribute is set, the access is made by specifying that the target region to be accessed is the protected region. This specifying of the protected region is made by the MTR (Memory Type Range) register 401 in the processor core 102.

Figure 5:
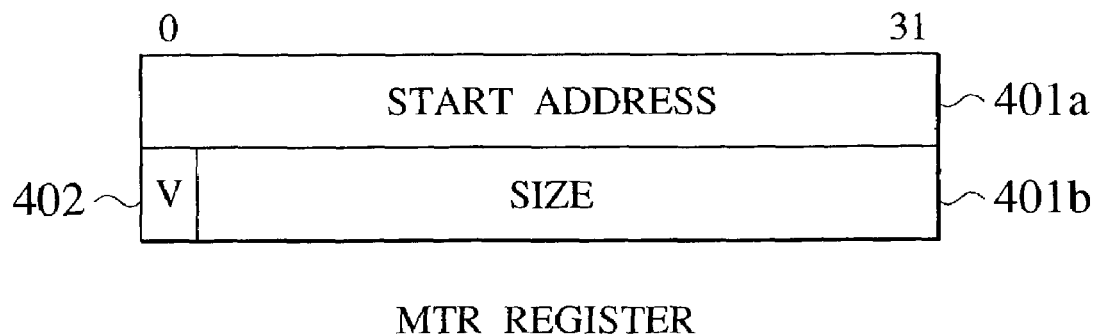
FIG. 5 is a diagram showing an exemplary configuration of an MTR register in the internal memory type tamper resistant microprocessor of FIG. 1.

FIG. 5 shows a format of the MTR register 401. The MTR register 401 is a register formed by two words, where a top address of the target region is written into the first word 401a, a size is written into the second word 401b, and a secret protection bit V is set in a field 402. In this way, the secret protection attribute (RPA: Requested Protection Attribute) requested by the task is set to the specified address region. When a value "0" is written into the requested secret protection bit, the secret protection attribute that has been set until then will become invalid.

Whether some memory access is going to be protected or non-protected is determined by the combination of the address range specified by the MTR register 401 and the address of the access target. When the access target address is within the range specified by the MTR register 401, it is a protection target. There may be a plurality of MTR registers that can be utilized by the task.

Figure 6:
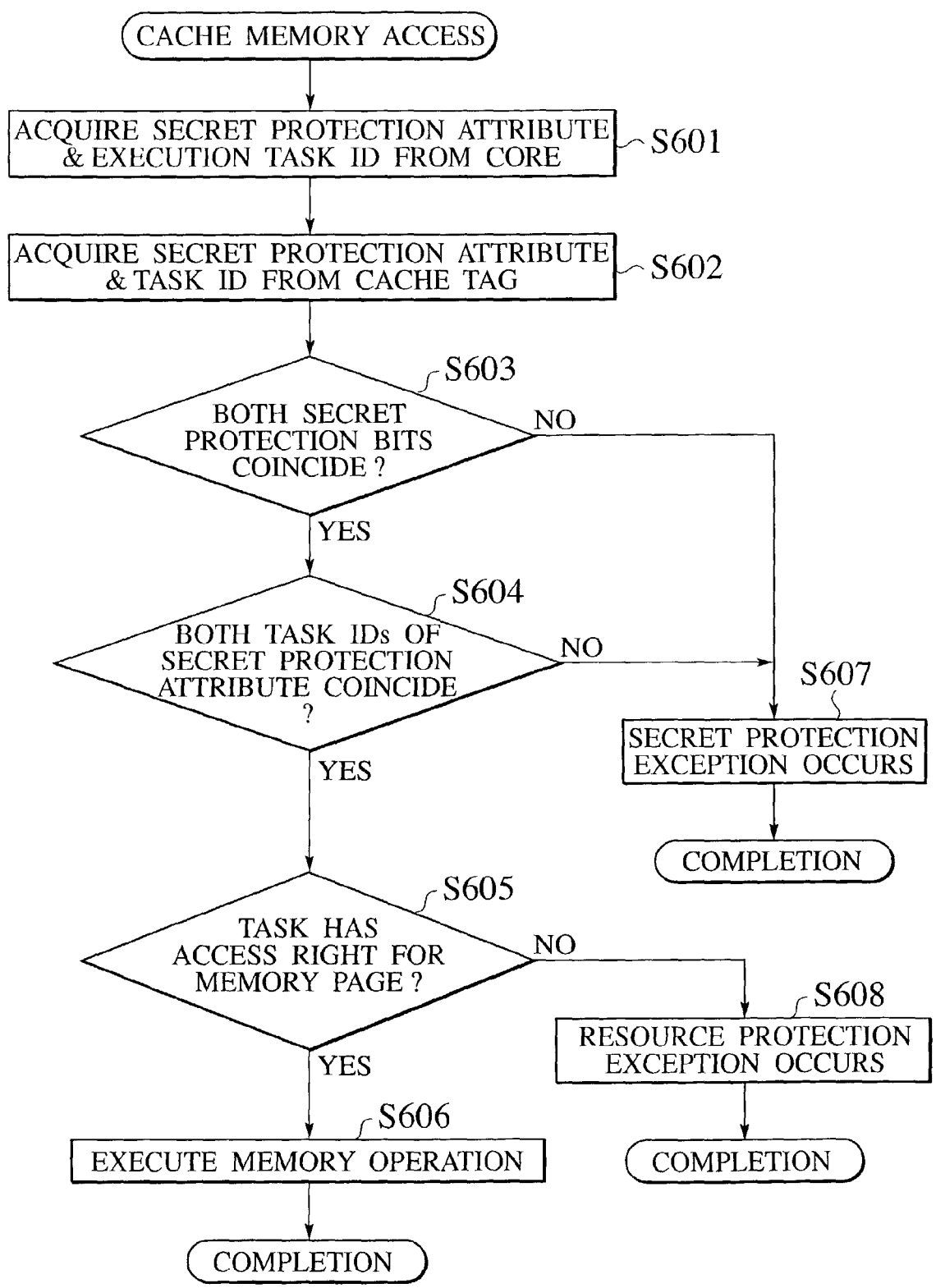
FIG. 6 is a flow chart showing a memory access procedure in the internal memory type tamper resistant microprocessor of FIG. 1.

FIG. 6 shows a procedure of the memory access, which is as follows. When the core 102 issues the reading request to the data cache 105 in order to execute the task, the currently executed task ID and the requested secret protection bit (RPA) requested by the task are outputted along with the address (S601). On the other hand, at a time of accessing the target region, the content from the user area 111 of the internal memory 110 is read into the cache memory 105. At this point, the entry corresponding to the memory address is read out from the MPA table 501, and the task ID and the memory secret protection bit (MPA) described in the entry are written into a tag of the corresponding cache line (S602). The order of the acquisition of the memory secret protection bit (MPA) and the acquisition of the requested secret protection bit (RPA) is not relevant here, and can be done simultaneously.

The requested secret protection attribute (RPA) outputted from the core 102 at a time of the memory access is the memory protection attribute that should be set in the access target memory as seen from some task. Consequently, this requested secret protection attribute (RPA) and the secret protection attribute (MPA) of the internal memory region that is the access target should coincide.

Thus, at the step S603, the memory secret protection bit (MPA) written into the cache tag and the requested secret protection bit (RPA) outputted from the core 102 are compared by the memory protection module 106. When the comparison result is the coincidence (S603 YES), the processing proceeds to the step S604, and whether the task ID written in the cache tag and the task ID outputted from the core 102 coincide or not is judged. The order of the judgement of S603 and the judgement of S604 is not relevant here, and can be done simultaneously.

Only when both the secret protection bit and the task ID coincide, the processing proceeds to the step S605, and whether the task to be executed has the access right for the memory page or not is judged. This is done because there can be case where the access of the target memory region of the task is prohibited in the memory management unit MMU due to the resource protection by the OS. If the task has the access right (S605 YES), the access to the target memory region is permitted, and the memory operation is executed at the step S606. If the access is prohibited (S606 NO), the resource protection exception occurs at the step S608.

On the other hand, at the step S603, if the memory secret protection bit written in the cache tag and the secret protection bit RPA requested by the task that is outputted from the core 102 do not coincide (S603 NO), or if the task IDs do not coincide at the step S604, the occurrence of the secret protection exception is notified to the processor core 102 at the step S607. As a result, the execution of this task is interrupted, and the resuming becomes impossible.

For example, when the task-k tries to access the target region, if the access to the secret protected target region is attempted by assuming that there is no secret protection due to the fact that a correct protection region is not set in the MTR register 401, the memory protection module 106 judges it as an access violation even if the task IDs coincide.

Also, when the requested protection bit RPA outputted from the core 102 attempts to make a memory access by specifying the secret protection, the access is similarly not permitted if the target region is a region for which there is no secret protection by the memory protection bit MPA written in the cache tag.

The judgement criteria for the secret protection exception and the judgement criteria for the resource protection exception are independent from each other, regardless of the judgement results or the judgement order.

Note that, in the case of accessing a non-protected memory by the data exchange with the OS, it is outside of the region specified in the MTR register 401, and the secret protection bit in the entry of the MPA table 501 should be "0", so that the access obviously succeeds.

If the access to the memory region of the internal memory allocated to the task-k is attempted by the other task, the task ID sent from the core 102 and the task ID of the cache tag do not coincide, so that the secret protection exception obviously occurs, and the execution of the task that made the violating access is interrupted.

Note that, the protection method of protected program regions in the program region is not mentioned above, but it is realized similarly as the task processing, by setting the secret protection attribute in the MPA table 501 of the corresponding region at a time of loading the program by the task generation instruction. In the case of the memory access of the program region, the requested secret protection attribute RPA is not defined by the MTR register 401, and the currently executed task ID is used directly.

(Task Switching)

When the task-k is executed by properly carrying out the memory operations, if the interrupt occurs, the information of the working register 114 at that point is temporarily saved into the entry of the task ID=k of the context table 116, as shown in FIG. 3, and the control is shifted to the OS. The content of this context table 116 can be known only by the privacy manager 301, and the OS and the other tasks cannot see its content. The MTR register 401 of the core 102 also specifies the requested protection attribute (RPA) requested by the task-k, so that it is protected from the access by the other task, as the register information of the task-k.

(Memory Releasing by the OS)

The OS can forcefully release the memory to which the secret protection attribute is set, and use it for the other purpose. The OS issues a secret protection forceful releasing instruction by specifying a memory region of the releasing target. As a result of the issuance of this instruction, the privacy manager 301 rewrites the MPA table 501 of the target region into no protection, initializes the corresponding user memory region 111 to a prescribed value, and deletes the information that has been stored there until then.

As the secret protection attribute is rewritten into no protection, the OS can use this memory region for the other purpose such as allocating it to the other task or using it for the OS itself.

By this memory release function, the protection of the secret and the appropriate memory resource management by the OS can be made compatible.

(Ending Task)

At a time of ending the secret protected task, the OS issues a task ending instruction by specifying this task ID. As a result of the issuance of the task ending instruction, the privacy manager 301 rewrites the corresponding entry of the MPA table 501 to which the secret protection attribute of the task is set, into a value indicating no protection. At the same time, that memory region is initialized similarly as in the case of the memory releasing. By this task ending function, it becomes possible to re-utilize the task ID, without leaking the secrets possessed by the task.

(Memory Access Integrity Guaranteeing Effect)

By the configuration of the microprocessor 100 described above, the memory access protection can be consistently guaranteed, as follows.

Suppose that the task $T_\varnothing$ carries out the "n" memory operations $Op_1$ to $Op_n$ with respect to the memory page $M_\varnothing$ of some address $A_\varnothing$, from the initial state of the memory page $M_\varnothing$. The initial state may be indeterminate, but there is a need to obtain the result in the final state by surely carrying out the operations $Op_1$ to $Op_n$. Of course the memory operations by another task should not be mixed during this process. The operation order of operations $Op_1$ to $Op_n$ should not be changed and any operation should not be omitted. If the page is initialized even once in a course of a series of operations, the result will become different from the expectation.

In the method of the first embodiment, the task $T_\varnothing$ first issues an instruction for securing the memory page $M_\varnothing$ and setting the secret protection attribute. As a result, the secret protection bit "1" and the task ID are set in the entry of the MPA table 501 corresponding to the memory page $M_\varnothing$. Then, the address of the memory page $M_\varnothing$ is set in the MTR register 401, and the operations $Op_1$ to $Op_n$ are carried out. The program itself is encrypted, so that it is difficult for the attacker to make the order change or the like, and it is guaranteed that the secret protection attribute setting of the memory page and the setting of the MTR register 401 made by the task itself, and the order of the operations $Op_1$ to $Op_n$ are correct.

Next, the memory page $M_\varnothing$ is referred by the real address, so that it is guaranteed that there is only one page that is referred by the address.

Thus, in the accesses by the operations $Op_1$ to $Op_n$, the fact that the accesses succeed without causing any secret protection exception to occur implies that the operations $Op_1$ to $Op_n$ are surely carried out with respect to the target memory page $M_\varnothing$.

Also, only the task itself can set the secret protection attribute to some memory page, and this task made the setting of the secret protection attribute only once before the operations $Op_1$ to $Op_n$. The accesses to the memory page by the operations $Op_1$ to $Op_n$ are made by specifying the secret protection bit "1" in the MTR register 401. If the OS carried out the releasing of the memory page during this process, the non-coincidence of the protection attribute (RPA) specified by the MTR register 401 and the protection attribute (MPA) of the memory page would have occurred during the operations $Op_1$ to $Op_n$, and the secret protection exception would have occurred so that the execution of the task would have been interrupted there.

Consequently, in the accesses by the operations $Op_1$ to $Op_n$, the fact that the accesses succeed without causing any secret protection exception to occur implies that the OS did not carry out the releasing of the memory at all during these operations.

In this way, by the configuration of the microprocessor of the first embodiment, the aforementioned integrity and the consistency of the memory operations can be guaranteed. Then, this integrity of the memory operations is compatible with the forceful memory releasing (resource management) by the OS and the access to the non-protected memory page by the task.

Such a compatibility of the resource management and the secret protection is realized as a result of the combination of the fact that the secret protection attribute of the memory can be set only by the task, and that the memory protection attribute MPA that is set to the memory page and the requested protection attribute RPA of the task are compared at a time of the memory access and the access is permitted only when these attributes coincide.

Note that a configuration in which the memory access is permitted only when MPA and RPA coincide by itself has an effect of improving the safety of the memory operation, in the case where the accesses to the protected memory and the non-protected memory coexist, even when the explicit secret protection attribute setting by the task is absent.

<Second Embodiment>

In the first embodiment, the setting of the secret protection attribute of the internal memory is made by an explicit instruction issued by the task. In the second embodiment, the setting of the secret protection attribute is made tacitly upon the memory access. Namely, while in a state where the secret protection is not set for the memory page (that is, when the memory protection attribute MPA has a value "0"). when the takes accesses the memory in a state for requesting the secret protection (that is, the requested protection attribute RPA has a value "1"), the memory protection bit "1" is automatically set to the field of the corresponding MPA entry. At the same time, the memory content is initialized by the random number. With this configuration, the safety of the memory content can be improved further.

Apart from the fact that the secret protection attribute is tacitly set to the target memory region at a time of the memory access, this embodiment is similar to the first embodiment. In the following, the tacit setting of the secret protection attribute at a time of the memory access will be described in detail.

Figure 7:
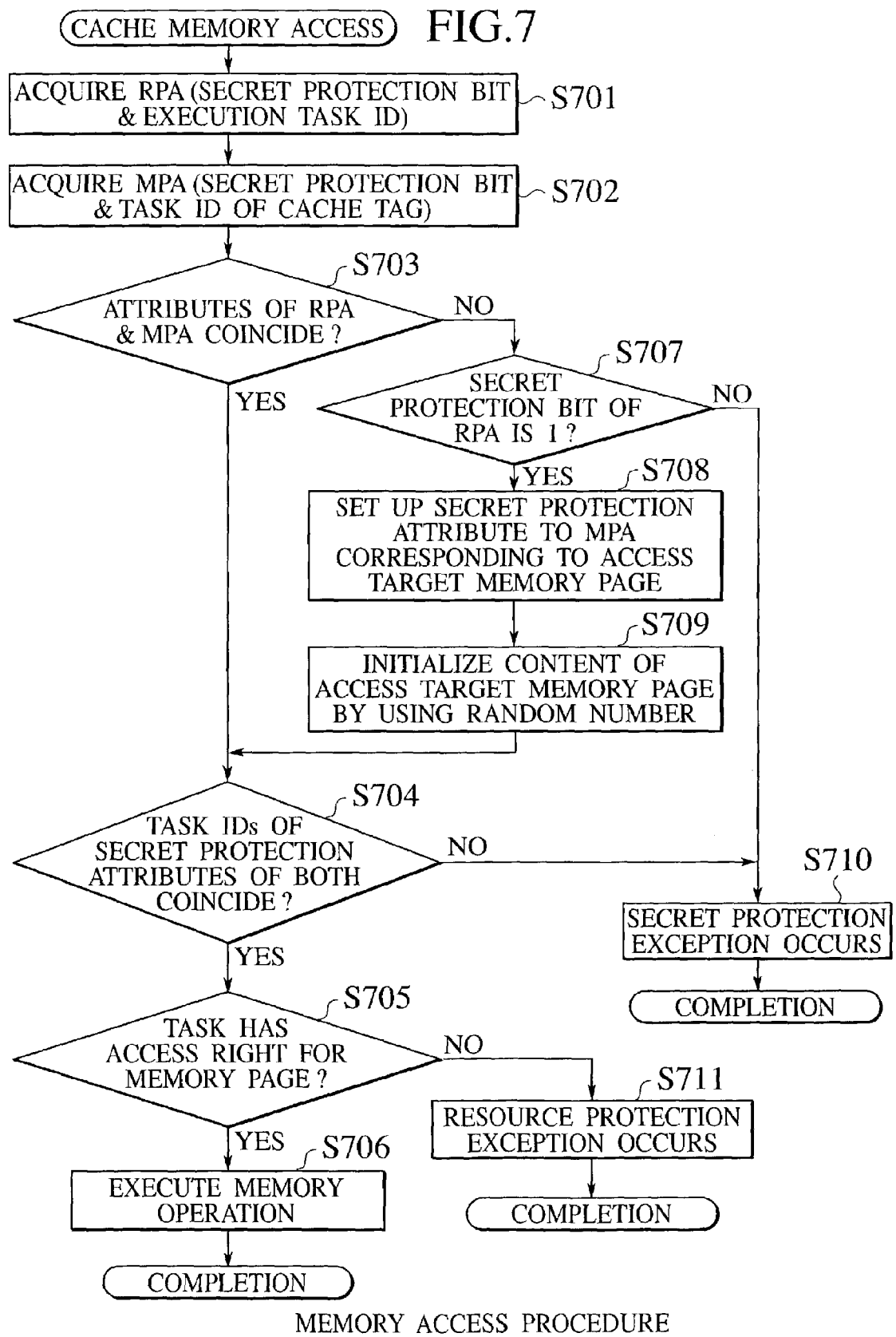
FIG. 7 is a flow chart showing a memory access procedure in the internal memory type tamper resistant microprocessor according to the second embodiment of the present invention.

FIG. 7 shows a procedure for the memory access including the tacit setting of the secret protection attribute. In accessing some memory region, whether it is going to be accessed as a protected region or not is determined by a combination of the address range specified by the MTR register 401 and the target address, similarly as in the first embodiment.

First, at the step S701, the secret protection bit and the task ID that constitute the requested secret protection attribute (RPA) is outputted from the core 102 along with the target address. On the other hand, at the step S702, the MPA protection bit and the task ID of the corresponding memory page stored in the cache tag are acquired by the memory protection module 106.

Then, at the step S703, whether the secret protection bits of RPA and MPA coincide or not is judged. If they coincide, whether the task IDs coincide or not is judged at the step S704, and then the resource protection judgement processing is carried out at the steps S705, S706 and S711 similarly as in the first embodiment.

If the secret protection bits do not coincide (S703 NO), whether the secret protection bit of RPA is "1" or not is judged at the step S707. If the secret protection bit of RPA is "1" (S707 YES), the processing is shifted to the privacy manager 301 at the step S708, where the secret protection bit value "1" and the task ID of the task that made the access are set to the MPA entry of the access target memory page. Then, at the step S709, the content of that page is entirely initialized by using the random number. Then, the processing proceeds to the step S704 to judge whether the task IDs coincide or not, and thereafter the processing similar to that of the first embodiment is carried out.

When the secret protection bit of RPA is not "1" at the step S707 (that is, when it is "0"), this access is handled as the secret protection violation, and the secret protection exception occurs at the step S710.

By the configuration of the second embodiment, the memory access of the task is consistently protected from the intentional memory alteration by the OS, as follows.

Suppose that the task $T_\varnothing$ carries out the "n" memory operations $Op_1$ to $Op_n$ with respect to the memory page $M_\varnothing$ of some address $A_\varnothing$, from the initial state of the memory page $M_\varnothing$. The initial state may be indeterminate, but there is a need to obtain the result in the final state by surely carrying out the operations $Op_1$ to $Op_n$. Of course the memory operations by another task should not be mixed during this process. The operation order of operations $Op_1$ to $Op_n$ should not be changed and any operation should not be omitted. If the page is initialized even once in a course of a series of operations, the result will become different from the expectation.

In the method of the second embodiment, the task $T_\varnothing$ issues a memory operation $Op_1$ with respect to the memory page $M_\varnothing$, by setting the address of the memory page $M_\varnothing$ to the MTR register 401. At that point, the memory secret protection attribute is set for the memory page $M_\varnothing$. In the initial state, the protection attribute is presumably not given to the memory page $M_\varnothing$ yet. The task $T_\varnothing$ then carries out the operations $Op_1$ to $Op_n$.

First, the program itself is encrypted, so that it is difficult for the attacker to make the order change or the like, and it is guaranteed that the secret protection attribute setting of the memory page and the setting of the MTR register 401, and the order of the operations $Op_1$ to $Op_n$ are correct.

Next, the memory page $M_\varnothing$ is referred by the real address, so that it is guaranteed that there is only one page that is referred by the address.

Thus, in the accesses by the operations $Op_1$ to $Op_n$, the fact that the accesses succeed without causing any secret protection exception to occur implies that the operations $Op_1$ to $Op_n$ are surely carried out with respect to the target memory page $M_\varnothing$.

Also, only the task itself can set the secret protection attribute of that task to some memory page, and the secret protection attribute is set by this task only at a time of the operations $Op_1$ to $Op_n$. Here, however, the content of the memory page is initialized by using the random number at that point.

Consequently, even if the OS carried out the releasing of the memory page during this process to rewrite the content of the memory page $M_\varnothing$ according to its intention, the protection attribute would be cleared in that case. As a result, the content is initialized by using the random number without a failure, so that the intentional alteration cannot succeed. Of course, the normal operation of the task is also obstructed, but there is a very low possibility in general that this result can lead to the intended result of the attacker.

Thus, by the configuration of the second embodiment, the secret memory of the task is protected from the intentional memory alteration. This protection is compatible with the forceful memory releasing by the OS and the access to the non-protected memory page by the task.

<Third Embodiment>

The first and second embodiments are directed to the secret protection scheme targeting at the microprocessor of the real address scheme, in which the safety of the secret of the task and the memory management by the OS are compatible and at the same time the communications between the task and the OS are secured and the consistency of the memory operations is guaranteed.

The third embodiment is directed to the internal memory type microprocessor which has a virtual memory mechanism. In particular, the prevention of the memory page substitution attack that can be a problem in the processor having the virtual memory mechanism will be described.

In the system having the virtual memory mechanism, the OS can allocate arbitrary virtual address to arbitrary page of the physical memory. Also, for this allocation, different allocations can be used depending on the tasks. As a descriptor of the allocation, a table on the internal main memory called page table will be used. The page table will be described below.

At a time of the memory access, in order to convert the virtual address into the physical address at high speed, only the necessary portion of the page table is often read into a special cache memory in advance. This temporary memory is called a TLB (Translation Look-aside Buffer).

The reading of the page table into the TLB can be done in two ways, one way is to do it by processor hardware and the other way is to do it by software. An example of the former is Pentium of Intel Corporation, and an example of the latter is R3000 of MIPS Corporation. The reading into the TLB of the third embodiment is applicable to either case.

Figure 8:
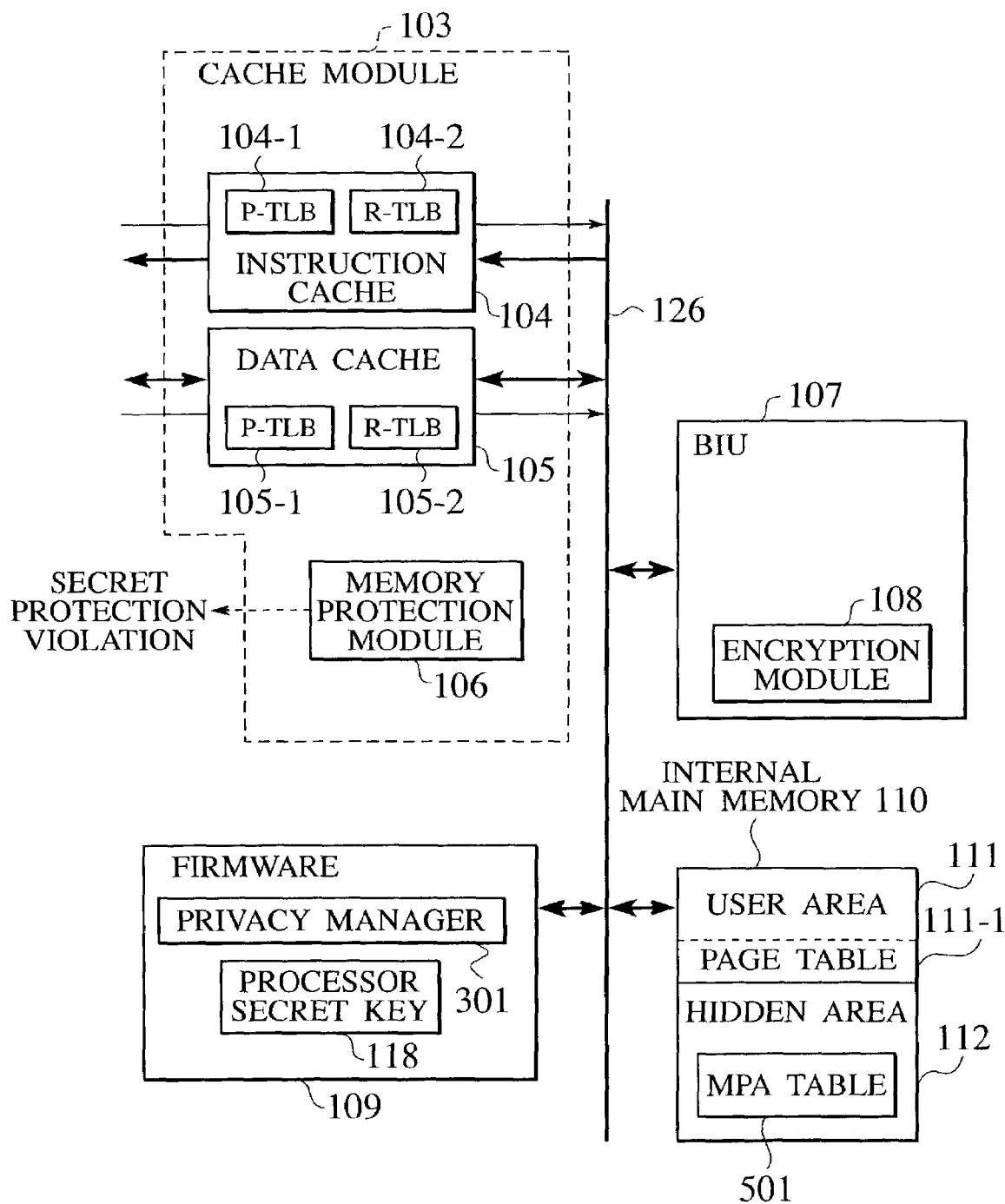
FIG. 8 is a block diagram showing a schematic configuration of a secret protection mechanism in an internal memory type tamper resistant microprocessor according to the third embodiment of the present invention.

FIG. 8 shows a TLB configuration in the microprocessor of the third embodiment. The setting of the secret protection attribute in the third embodiment is the explicit setting by the task similarly as in the first embodiment. Consequently, the configuration of the microprocessor other than the TLB configuration is similar to that shown in FIG. 1.

First, the page table 111-1 is set up in the user area 111 of the internal memory 110. Also, the entry of the MPA table 501 (see FIG. 4) contains a field for storing a virtual address specified to this memory page in addition to the task ID.

Next, the instruction cache 104 has P-TLB 104-1 and R-35 TLB 104-2, and the data cache 105 similarly has P-TLB 105-1 and R-TLB 105-2. R-TLB is a TLB for the address conversion, while P-TLB is a TLB for storing the memory secret protection attribute, which complements R-TLB to make the secret protection of the task safer. R-TLB and P-TLB have entries in one-to-one correspondence, and when the writing into R-TLB is made, the processing to be described below will be carried out automatically with respect to P-TLB. In other words, the update of P-TLB is made indirectly by using the writing of R-TLB as a trigger, and anything other than the privacy manager 301 cannot operate P-TLB explicitly.

In the third embodiment, a virtual address at a time of specifying the attribute is maintained as an element of the secret protection attribute of the task. As described above, it is assumed that the setting of the virtual address is carried out when the instruction for setting the secret protection attribute is issued by the task, similarly as in the first embodiment. The address specified by the task will be used as a virtual address. Here, it is assumed that a memory page $M_\varnothing$ of a physical address $P_\varnothing$ is mapped to a virtual address $V_\varnothing$. At this point, the entry corresponding to the physical page $P_\varnothing$ of the memory page $M_\varnothing$ is selected as the entry of the MPA table 501 into which the privacy manager 301 writes the protection attribute. The task ID and the virtual address $V_\varnothing$ of the memory page $M_\varnothing$ are written into the selected MPA entry. There can be cases where the virtual address allocated to the physical page is different depending on the task, but the protected memory sharing among the tasks is not assumed in the third embodiment, so that this is not a problem as it cannot be an access from another task as long as the protection attribute is set to this memory.

Figure 9:
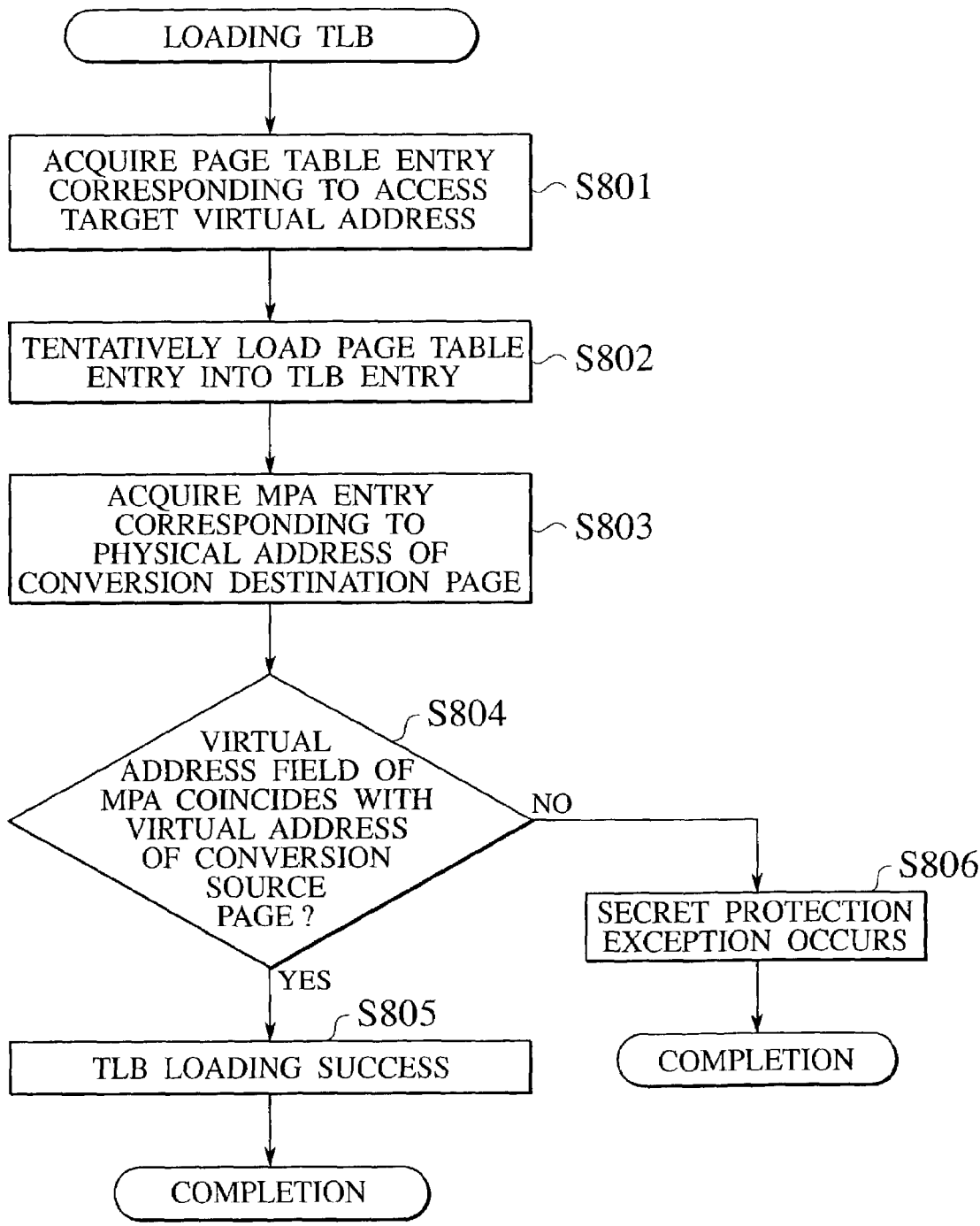
FIG. 9 is a flow chart showing a memory access procedure in the internal memory type tamper resistant microprocessor according to the third embodiment of the present invention.

FIG. 9 shows the procedure for the memory access in the microprocessor of the third embodiment.

At the step S801, when some memory page $M_\varnothing$ is to be accessed, the entry corresponding to the virtual address $V_\varnothing$ of the access target is acquired, prior to the data reading. At the step S802, the acquired entry is loaded into R-TLB of the data cache 105 from the page table 111-1, and a preparation for the conversion from the virtual address $V_\varnothing$ to the physical address $P_\varnothing$ is made. The loading into R-TLB is carried out by hardware or software (OS).

When the loading is carried out, at the step S803, the MPA entry corresponding to the physical address $P_\varnothing$ to which the conversion is to be made is automatically read out by the privacy manager 301. At the step S804, the virtual address $V_\varnothing$ at a time of the setting read out from the MPA table 501 is matched with the virtual address of R-TLB to be converted, and whether they coincide or not is judged.

If they coincide (step S804 YES), the TLB loading is success. If they do not coincide (step S804 NO), the TLB loading is failure and the secret protection exception occurs at the step S806.

When the TLB loading is success, the task ID of the MPA entry and the presence/absence of the secret protection are written into the corresponding P-TLB 105-1 of the data cache 105. In addition, the task ID and the presence/absence of the secret protection written in the corresponding entry of P-TLB 105-1 are written into a tag of the cache line which is read as a result of the address conversion that referred to R-TLB 105-2. Thereafter the processing similar to that of the first embodiment is carried out.

In the first embodiment, each one of the memory protection attribute (MPA) maintained in correspondence to the physical memory and the requested protection attribute (RPA) requested by the task contains the secret protection bit and the task ID, and their comparison is carried out at a time of the memory access request from the core.

In the third embodiment, the comparison of the memory protection attribute (MPA) and the requested protection attribute (RPA) is carried out distributedly at a time of the loading of the TLB which is carried out in page units, and at a time of the memory access which is carried out in word units. At a time of the loading of the TLB, the virtual address $V_\varnothing$ requested by the task and the virtual address at a time of the protection attribute setting which is maintained in the MPA table 501 are compared. At a time of the memory access, the secret protection bits and the task IDs are compared, similarly as in the first embodiment.

Even in the third embodiment, the requested protection attribute RPA generated as a result of the execution of the task and the memory protection attribute MPA for describing the protection attribute of the memory that is a target region are compared basically, but there is a difference in that the comparison is made for each item of the attribute, distributedly in time, at different granularity.

The configuration of the third embodiment is effective against the following attack, because the integrity of the memory operations can be guaranteed.

Consider the case where the memory pages $M_\varnothing$ and $M_1$ for which the protection attributes are set are arranged at the virtual addresses $V_\varnothing$ and $V_1$, and then the operations $Op_1$ to $Op_n$ are to be carried out. Which one of $V_\varnothing$ and $V_1$ at which each of the operations $Op_1$ to $Op_n$ is to be carried out is determined in advance.

However, by using the virtual memory mechanism, the arrangements on the virtual addresses of the physical memory pages $M_\varnothing$ and $M_1$ can be interchanged at arbitrary timing during the operations $Op_1$ to $Op_n$. For example, the operation with respect to the memory page $M_1$ is a memory clear, by interchanging the virtual addresses of the operation target memory pages, it is possible to clear the memory page $M_\varnothing$. In this case, the processing becomes different from what is intended by the programmer, and such a substitution attack cannot be prevented by the configuration that presupposes only the real address as in the first embodiment.

In the third embodiment, the virtual address referred at a time of the memory secret protection attribute setting is preserved as the secret protection attribute definition of the physical memory page, and the virtual address of the conversion target and the preserved address are compared at a time of the execution of the address conversion. Then, the access is prohibited when the non-coincidence occurs, so as to prevent the above described memory page re-arrangement attack. In the third embodiment, the efficiency of the processing is improved by carrying out the comparison processing at a time of the loading of the TLB, but the comparison processing may be carried out at every occasion of the memory referring by the processor core. In this case, the efficiency is lowered somewhat but the similar effect can be obtained.

Note that in the example described above, the guarantee of the integrity of the memory accesses in the case of using the virtual memory is described in conjunction with the configuration by which the task explicitly issues the memory secret protection attribute setting instruction. However, it should be noted that the virtual address comparison processing itself is effective in preventing the memory substitution attack utilizing the virtual memory, even when this processing alone is used independently.

Also, at a time of issuing the secret protection attribute setting instruction, P-TLB in which the conversion of the corresponding physical address was defined should preferably be flashed once, because if there is a remaining TLB entry that was read before the issuance of the secret protection attribute setting instruction, the following problem may arise. For example, when the task refers to the cache line that is read as a result of referring to the TLB entry in the non-protected state, the secret protection attribute is not set contrary to the expectation, such that the secret protection exception occurs and the processing is interrupted. For this reason, it is preferable to flash P-TLB at a time of issuing the secret protection attribute setting instruction.

<Fourth Embodiment>

In the firth to third embodiments, the configurations for realizing the exclusive memory access by the task in the internal memory type tamper resistant microprocessor are described.

In the fourth embodiment, a configuration in which a plurality of tasks that share the secret can share some memory region, while the exclusive access is possible for the tasks that do not have the secret will be described.

In the fourth embodiment, the base configuration is similar to the configuration of the first embodiment shown in FIG. 1. Consequently, the differences will be mainly described in the following.

First, a secret protection information that is necessary for the task to access the shared region of the internal memory is maintained in the MTR register 401. In the first and second embodiments, only the address region is maintained in the MTR register 401, but in the fourth embodiment, in addition to the address region, a secret value for the purpose of sharing is also maintained. The secret value is specified by the task at a time of setting the secret protection attribute.

Then, this secret value is used as the requested secret protection attribute (RPA) at a time of the memory referring. Note that a length of the secret value should preferably be 128 bits or more in order to prevent the exhaustive trial attack.

This secret value is also specified when the secret protection attribute is set for the memory page by the task, and stored into the corresponding entry of the MPA table. Consequently, in the fourth embodiment, four items including the presence/absence of the protection, the task ID, the virtual address, and the secret value are stored into the entry of the MPA table 501.

In the case where the memory protection attribute (MPA) of the program region is to be set at a time of the loading of the program, a value of the program key by which the program was encrypted is written as the secret value of the MPA entry.

Figure 10:
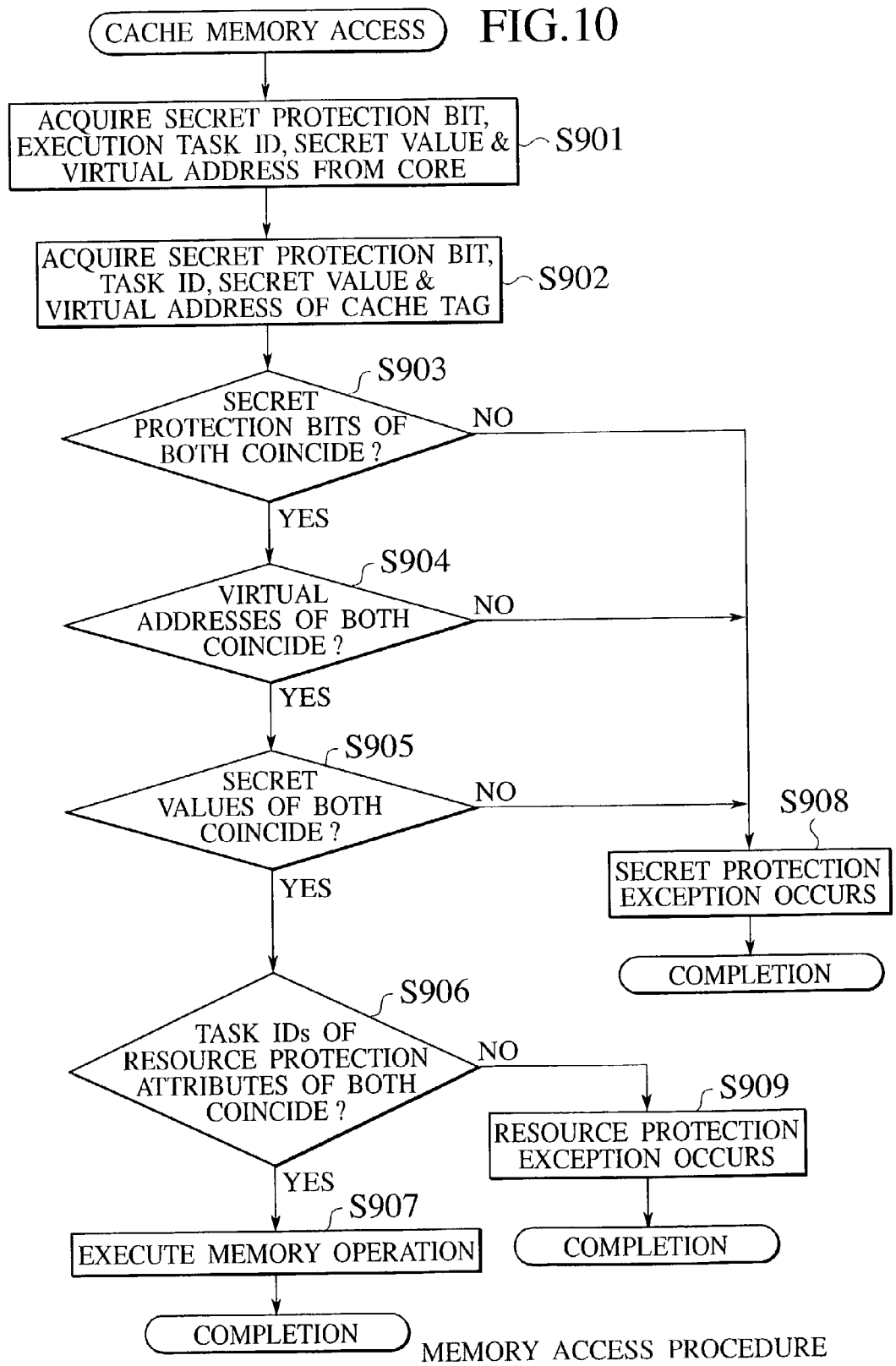
FIG. 10 is a flow chart showing a memory access procedure in the internal memory type tamper resistant microprocessor according to the fourth embodiment of the present invention.
Figure 11:
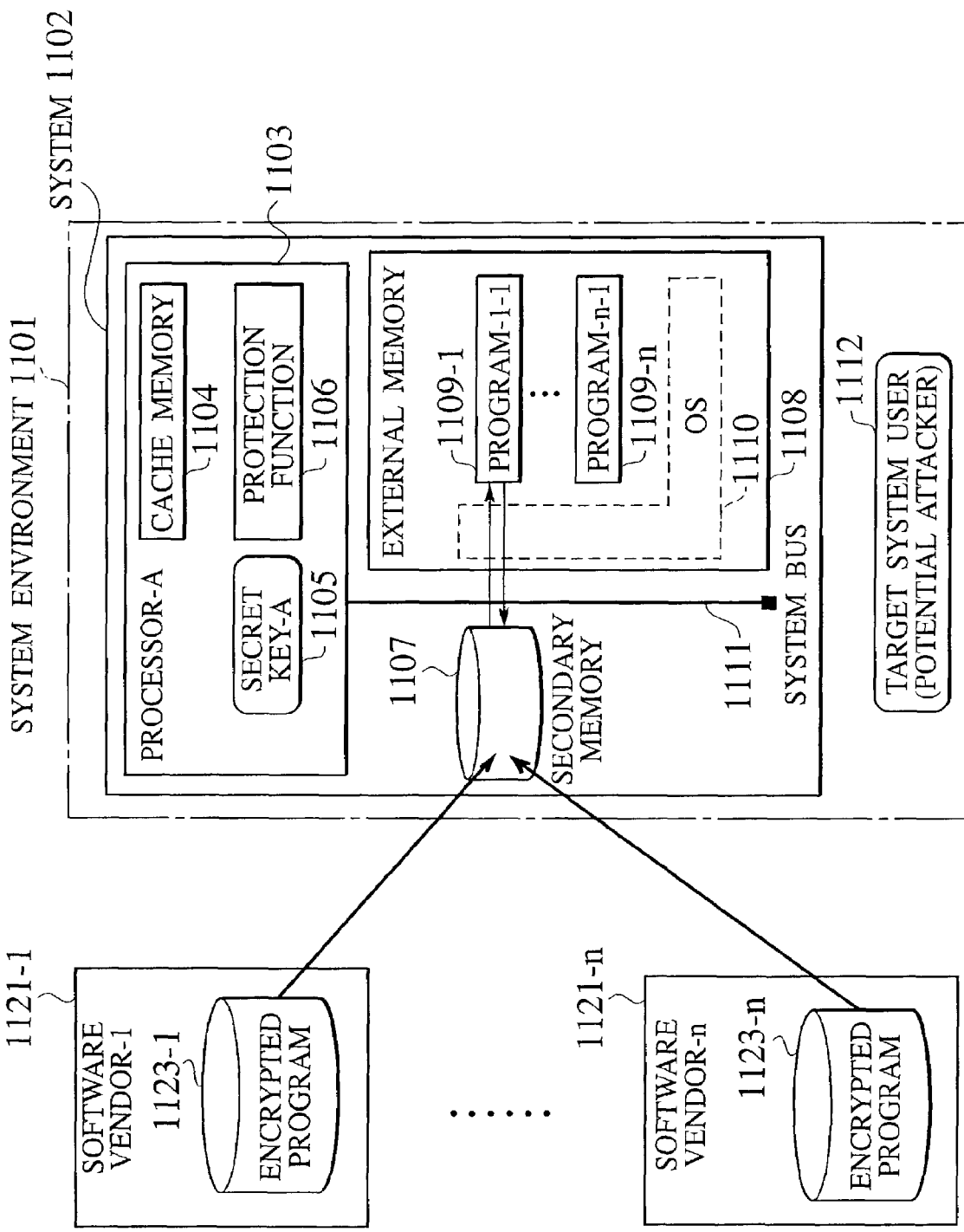
FIG. 11 is a diagram showing a general multi-party application protection environment.

FIG. 10 shows the procedure for the memory access in the microprocessor of the fourth embodiment.

Whether the access is permitted or not is judged by the coincidence of the requested secret protection attribute (RPA) outputted from the processor core 102 and the memory secret protection attribute (MPA) stored in the cache tag, similarly as in the first to third embodiments described above.

Namely, at the step S901, the secret protection bit indicating the presence/absence of the protection, the task ID, the virtual address and the secret value are obtained from the core, and at the step S902, the memory protection bit, the task ID, the virtual address and the secret value written in the cache tag are obtained. Among the four items outputted from the core, three items excluding the task ID will be used as the requested secret protection attribute (RPA). This is because the memory is shared among the tasks so that the judge criteria are made to be not dependent on the task ID, and the matching of the secret value is used instead.

At the step S903, the secret protection bit of RPA outputted from the core and the secret protection bit of MPA written in the cache tag are compared. If they do not coincide, the secret protection exception occurs at the step S908, similarly as in the first to third embodiments.

If these secret protection bits coincide at the step S903, the virtual addresses and the secret values of RPA and MPA are respectively compared at the steps S904 and S905. If they do not coincide, the secret protection exception occurs at the step S908.

If all of the secret protection bits, the virtual addresses and the secret values coincide (S903 YES, S904 YES and S905 YES) in relation to the secret protection, whether the task IDs coincide or not is judged in relation to the resource protection. If they do not coincide, the resource protection exception occurs at the step S909. If they coincide, the memory operation is executed at the step S907.

As a concrete manner for utilizing the microprocessor of the fourth embodiment, there is an exemplary case where the common secret value X is embedded in advance in a plurality of programs, for example, and a task A generated from one program secures the common memory region and sets the secret value X, and then another task B accesses the common memory region by setting the secret value X in the MTR register 401. The secret value X is not necessarily a predetermined value, and can be a value shared by the well known key exchange scheme such as the Diffie-Hellman scheme.

As described in relation to FIG. 10, the access to this common memory region by the task that does not know the secret value X causes the secret protection exception and obviously fails. Consequently, it is possible to realize the exclusive memory sharing by only those tasks that know the secret value X.

In the fourth embodiment, the exclusive (safe) sharing of the memory region is described in conjunction with the memory secret protection attribute setting instruction by the task. However, the method for sharing the memory region safely by utilizing the secret value in RPA and MPA is not dependent on the existence of the secret protection attribute setting instruction issued by the task, and it should be noted that the safe memory sharing among the tasks becomes possible, even when this method alone is used independently.

As described, according to the present invention, it is possible to provide an internal memory type tamper resistant microprocessor, which is capable of making the resource management of the internal memory by the OS and the secret protection compatible, securing communications between the OS and the task, and protecting a plurality of programs from the intentional alteration, under the multi-task environment.

In the internal memory type tamper resistant microprocessor of the present invention, the programs and data are stored in the internal memory in the plaintext state, so that the overhead of the processing performance can be reduced as much as the encryption processing becomes unnecessary for the memory reading or writing.

Also, under the multi-task environment in which a plurality of programs are run in a pseudo-parallel manner, even if the OS that carrying out the memory resource management attempts the illegal processing by utilizing the releasing of the memory page, such an attempt will not succeed because the access to that memory page is not permitted unless the secret protection attribute requested to the access target memory page by the task and the secret protection attribute set for the memory region that is necessary for this task processing coincide.

With this configuration, the secrets of the plurality of programs are protected individually, and the resource management by the OS and the secret protection of each program can be made compatible. Also, the non-protected region can be secured by managing the secret protection attribute of the memory page so that the communications between the OS and the task can be guaranteed.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An inner memory type tamper resistant microprocessor, comprising:

a decryption unit configured to decrypt each one of a plurality of programs encrypted by different encryption keys;

an internal memory configured to store the plurality of programs decrypted by the decryption unit, in plaintext in memory page units, resources thereof being managed by an operating system;

a requested secret protection attribute maintaining unit configured to set and store a requested secret protection attribute requested for each access target memory page by a task, exclusively from other tasks, at a time of reading a program into memory pages and executing the program as the task;

a memory secret protection attribute maintaining unit configured to store a memory secret protection attribute for each memory page, the memory secret protection attribute being reset by the operating system as occasion demands;

a secret protection management unit configured to set the memory secret protection attribute in the memory secret protection attribute maintaining unit, for each access target memory page by the task, at a time of executing the task; and a memory protection unit configured to compare the requested secret protection attribute for each access target memory page stored in the requested secret protection attribute maintaining unit and the memory secret protection attribute for each access target memory page stored in the memory secret protection attribute maintaining unit, and refuse an access to each access target memory page when the requested secret protection attribute for each access target memory page and the memory secret protection attribute for each access target memory page do not coincide.

2. The internal memory type tamper resistant microprocessor of claim 1, wherein:

each one of the requested secret protection attribute maintaining unit and the memory secret protection attribute maintaining unit also stores a task identifier for identifying the task; and the memory protection unit also compares the task identifier stored in the requested secret protection attribute maintaining unit and the task ID stored in the memory secret protection attribute maintaining unit, and refuses the access to each access target memory page when the task identifier stored in the requested secret protection attribute maintaining unit and the task ID stored in the memory secret protection attribute maintaining unit do not coincide.

3. The internal memory type tamper resistant microprocessor of claim 1, wherein the secret protection management unit sets the memory secret protection attribute, according to an instruction issued by the task.

4. The internal memory type tamper resistant microprocessor of claim 1, wherein the secret protection management unit sets the memory secret protection attribute according to a comparison result obtained by the memory protection unit, when the task accesses each access target memory page.

5. The internal memory type tamper resistant microprocessor of claim 4, wherein the secret protection management unit sets the memory secret protection attribute that requires a secret protection and initializes each access target memory page, when the task requests the requested secret protection attribute for each access target memory page that requests the secret protection while the memory secret protection attribute maintaining unit stores the memory secret protection attribute that indicates no secret protection.

6. The internal memory type tamper resistant microprocessor of claim 1, further comprising:

an address conversion unit configured to convert a virtual address in the internal memory into a physical address in the internal memory;

wherein the memory secret protection attribute maintaining unit stores the memory secret protection attribute for each physical address of each memory page, and each one of the requested secret protection attribute maintaining unit and the memory secret protection attribute maintaining unit also stores a virtual address of each access target memory page.

7. The internal memory type tamper resistant microprocessor of claim 6, wherein the memory protection unit also compares the virtual address stored in the requested secret protection attribute maintaining unit and the virtual address stored in the memory secret protection attribute maintaining unit at a time of a conversion from the virtual address to the physical address, and controls the address conversion unit to carry out the conversion when the virtual address stored in the requested secret protection attribute maintaining unit and the virtual address stored in the memory secret protection attribute maintaining unit coincide.

8. The internal memory type tamper resistant microprocessor of claim 1, wherein:

the internal memory has a shared region shared by a plurality of tasks;

each one of the requested secret protection attribute and the memory secret protection attribute contains a secret value for sharing the shared region; and the memory protection unit also compares the secret value contained in the requested secret protection attribute and the secret value contained in the memory secret protection attribute, and permits an access to the shared region when the secret value contained in the requested secret protection attribute and the secret value contained in the memory secret protection attribute coincide.

9. A secret protection method for an inner memory type tamper resistant microprocessor, comprising:

(a) decrypting each one of a plurality of programs encrypted by different encryption keys;

(b) storing the plurality of programs decrypted by the step (a), into an inner memory in plaintext in memory page units, resources of the inner memory being managed by an operating system;

(c) setting and storing a requested secret protection attribute requested for each access target memory page by a task, exclusively from other tasks, at a time of reading a program into memory pages and executing the program as the task;

(d) setting and storing a memory secret protection attribute for each access target memory page by the task, at a time of executing the task, the memory secret protection attribute being reset by the operating system as occasion demands; and (e) comparing the requested secret protection attribute for each access target memory page stored by the step (c) and the memory secret protection attribute for each access target memory page stored by the step (d), and refusing an access to each access target memory page when the requested secret protection attribute for each access target memory page and the memory secret protection attribute for each access target memory page do not coincide.

10. The secret protection method of claim 9, wherein:

each one of the step (c) and the step (d) also stores a task identifier for identifying the task; and the step (e) also compares the task identifier stored by the step (c) and the task ID stored by the step (d), and refuses the access to each access target memory page when the task identifier stored by the step (c) and the task ID stored by the step (d) do not coincide.

11. The secret protection method of claim 9, wherein the step (d) sets the memory secret protection attribute, according to an instruction issued by the task.

12. The secret protection method of claim 9, wherein the step (d) sets the memory secret protection attribute according to a comparison result obtained by the step (e), when the task accesses each access target memory page.

13. The secret protection method of claim 12, wherein the step (d) sets the memory secret protection attribute that requires a secret protection and initializes each access target memory page, when the task requests the requested secret protection attribute for each access target memory page that requests the secret protection while the memory secret protection attribute stored by the step (d) indicates no secret protection.

14. The secret protection method of claim 9, further comprising:
   (f) converting a virtual address in the internal memory into a physical address in the internal memory;
   wherein the step (d) stores the memory secret protection attribute for each physical address of each memory page, and each one of the step (c) and the step (d) also stores a virtual address of each access target memory page.

15. The secret protection method of claim 14, wherein the step (e) also compares the virtual address stored by the step (c) and the virtual address stored by the step (d) at a time of a conversion from the virtual address to the physical address, and controls the step (f) to carry out the conversion when the virtual address stored by the step (c) and the virtual address stored by the step (d) coincide.

16. The secret protection method of claim 9, wherein the internal memory has a shared region shared by a plurality of tasks;
   each one of the requested secret protection attribute and the memory secret protection attribute contains a secret value for sharing the shared region; and
   the step (e) also compares the secret value contained in the requested secret protection attribute and the secret value contained in the memory secret protection attribute, and permits an access to the shared region when the secret value contained in the requested secret protection attribute and the secret value contained in the memory secret protection attribute coincide.

* * * * *